United States Patent
Braziunas

(10) Patent No.: US 7,604,676 B2
(45) Date of Patent: Oct. 20, 2009

(54) INERTIAL IMPACTOR FOR CLOSED CRANKCASE VENTILATION

(75) Inventor: Gregory David Braziunas, Northville, MI (US)

(73) Assignee: Detroit Diesel Corporation, Detroit, MI (US)

( * ) Notice: Subject to any disclaimer, the term of this patent is extended or adjusted under 35 U.S.C. 154(b) by 536 days.

(21) Appl. No.: 11/345,938

(22) Filed: Feb. 2, 2006

(65) Prior Publication Data

US 2007/0175186 A1   Aug. 2, 2007

(51) Int. Cl.
*B01D 50/00* (2006.01)
(52) U.S. Cl. .................. 55/385.3; 55/434.2; 55/442; 55/462; 55/468; 55/DIG. 14; 55/DIG. 19; 123/198 E; 123/572
(58) Field of Classification Search ............ 55/434, 55/442, 462, 464, 465, 385.3, DIG. 14, 434.2–434.4, 55/468, DIG. 19; 60/39.01–39.83; 123/198 E, 123/572–574, 41, 86; 95/32, 31, 267, 272
See application file for complete search history.

(56) References Cited

U.S. PATENT DOCUMENTS

| | | | | |
|---|---|---|---|---|
| 1,899,993 A * | 3/1933 | Spencer | ............... | 55/419 |
| 2,557,332 A * | 6/1951 | Wright | ............... | 55/436 |
| 3,859,063 A * | 1/1975 | Porter et al. | ............... | 96/297 |
| 4,133,202 A | 1/1979 | Marple | ............... | 73/28 |
| 4,926,679 A | 5/1990 | Dewhurst | ............... | 73/28 |
| 5,024,203 A | 6/1991 | Hill | ............... | 123/573 |
| 5,078,760 A | 1/1992 | Haldipur et al. | ............... | 55/96 |
| 5,343,592 A * | 9/1994 | Parise | ............... | 15/353 |
| 5,638,786 A * | 6/1997 | Gimby | ............... | 123/198 E |
| 5,788,741 A | 8/1998 | Burton et al. | ............... | 95/32 |
| 5,904,752 A | 5/1999 | Willeke | ............... | 95/216 |
| 5,916,640 A | 6/1999 | Liu et al. | ............... | 427/475 |
| 5,932,795 A | 8/1999 | Koutrakis et al. | | |
| 6,106,592 A | 8/2000 | Paranjpe et al. | ............... | 95/65 |
| 6,290,738 B1 * | 9/2001 | Holm | ............... | 55/309 |
| 6,412,479 B1 * | 7/2002 | Canfield et al. | ............... | 123/573 |
| 6,435,043 B1 | 8/2002 | Ferguson et al. | ............... | 73/863.22 |
| 6,475,255 B1 * | 11/2002 | Walker, Jr. | ............... | 55/315 |
| 6,478,018 B2 | 11/2002 | Fedorowicz et al. | ............... | 123/572 |
| 6,478,019 B2 | 11/2002 | Fedorowicz et al. | ............... | 123/572 |
| 6,478,856 B1 | 11/2002 | Leibholz et al. | ............... | 95/268 |
| 6,732,569 B2 | 5/2004 | Ondov et al. | ............... | 73/28.05 |
| 6,797,040 B2 * | 9/2004 | Lenzing | ............... | 95/267 |
| 6,807,958 B2 * | 10/2004 | Kabat et al. | ............... | 123/574 |
| 2005/0247035 A1 * | 11/2005 | Noga | ............... | 55/462 |
| 2006/0117725 A1 * | 6/2006 | Oh et al. | ............... | 55/462 |

* cited by examiner

*Primary Examiner*—Duane Smith
*Assistant Examiner*—Dung Bui
(74) *Attorney, Agent, or Firm*—Bill C. Panagos; Rader, Fishman & Grauer, PLLC

(57) ABSTRACT

An inertial impactor that uses gas stream flow rate to separate oil particles in internal combustion engine crankcase emissions. The inertial impactor is particularly adapted for use in closed crankcase ventilation systems. The oil particles have a particle size of from about 0.3 μm to about 0.7 μm. Elimination of the oil particles in the crankcase emission gas stream results in cleaner intake air to the turbocharger air intake system.

10 Claims, 2 Drawing Sheets

INERTIAL IMPACTOR FOR CLOSED CRANKCASE VENTILATION

BACKGROUND OF THE INVENTION

1. Field of the Invention

The present invention relates to an inertial impactor that uses the flow rate of a gas stream to separate oil particles in the engine crankcase emissions. The impactor is designed to separate those particles whose aerodynamic diameters in the range of 0.3 μm to 0.7 μm.

The present invention further relates to an inertial impactor to be placed with the impaction plate in close proximity to a heat source, like a hot surface such as an exhaust manifold to aid in the deposition of the oil particles on the impaction plate.

The present invention further relates to an inertial impactor that removes oil particles of a specific particle size from the gas stream from the engine crankcase emissions that will build up in an impaction plate and not deposit onto the turbocharger blades.

2. Description of the Related Art

Ferguson et al., U.S. Pat. No. 6,435,043 discloses a method of collecting particles in a gas sample that comprises impacting the particles in the gas sample on a porous material onto impactors that include porous substrates.

Fedorowicz et al., U.S. Pat. No. 6,478,018 discloses a flat panel filter element for diesel engine crankcase ventilation filter. The flat panel element has a media that includes coalescing media spinning a horizontal support and sealing a perimeter border framer and passing downwardly. Fedorowiz et al. '018 includes an inertial separator in a pre-chamber wherein the inertial separator is preferably and vertically extending rough porous member.

Holm, U.S. Pat. No. 6,290,738 discloses an inertial gas liquid separator having an inlet for receiving a gas liquid stream and an outlet for discharging a gas stream. Nozzle structure in the housing has a plurality of nozzles receiving the gas liquid stream from the inlet and accelerating the gas liquid stream through the nozzles. An inertial collector in the housing in the path of the accelerated gas liquid stream causes a sharp directional change in the gas liquid stream and in a preferred form has a rough porous collection surface causing liquid particles separation from the liquid gas stream of smaller size liquid particles than a smooth non-porous impactor impingement surface and without the sharp cut-off size of the porous structures. This improves the overall separation efficiency including for smaller liquid particles.

Ferguson et al., U.S. Pat. No. 6,435,043 we do not understand the initial impactor of the present invention to use a porous substrate.

Burton et al., U.S. Pat. No. 5,788,741 discloses a virtual impactor that can remove essential particles from an air stream. Particularly, the impactor separates particles larger than 0.1 micrometers from an air stream. The virtual impactor comprises nozzle means for accelerating the entering air stream particles receiving means positioned downstream from the nozzle and a chamber serve communication that the gap between the nozzle and the receiver. The nozzle comprises an inlet and an elongated outlet having both dimensions between 0.007 and 0.010 inches and further having a longitudinal axis normal to and passing through the center of the elongated outlet. The particle receiving means comprises an elongated inlet having a width dimension of between about 0.013 and 0.015 inches and an outlet. It further has a longitudinal axis normal to and passing through the center of the elongated inlet. The particle is receiving means is positioned downstream from the outlet of the nozzle so that the flow gap there between is between about 0.008 and 0.012 inches and is positioned so that longitudinal axis of the nozzle and the longitudinal axis of the receiver are substantially coaxial and so that the width dimension of the nozzle means outlet and the width dimension of the receiving means are substantially parallel. The chamber is configured to be in fluid communication with a vacuum source, as is the outlet of the particle receiving means.

Haldipur et al., U.S. Pat. No. 5,078,760 discloses an apparatus and method for separating particulates from gas produced by combustion of fossil fuel. The apparatus includes a main vessel having lower compartment in which fuel is burned in an upper compartment in which the separation particulates take place. The separation is effective by combining rough cyclones for separating the larger particles with modules of cross flow filters for separating the residual smaller particles that emerge from the cyclones. The upper compartment includes a plurality of pressure vessels each containing a cyclone and modules of cross flow filters mounted vertically.

Hill, U.S. Pat. No. 5,024,203 discloses an oil separator positioned in the positive of the crankcase ventilation system adjacent to the engine such that oil separator is subjected to a predetermined minimum operator temperature. The oil separator comprises an opening through which the oil, fuel and water particles pass with the gas stream. The oil separator is constructed an arranged to cause the oil particles to strike an impactor plate and be separated from the gas flow while fuel and water particles pass on through the system and re-enter the engine.

Marple, U.S. Pat. No. 4,133,202 discloses a single stage impactor having a plurality of different size nozzles that predicate a particular collection efficiency curve that approximates a predetermined curve. The impactor has a particle collection plate mounted in the casing having a passage connected to an air-moving device. The nozzle plate has a plurality of different sized nozzles mounted on the collection plate. The sizes of the different nozzles are coordinated with the pressure drop around the nozzle plate to provide the nozzles with different particle collection cut-off characteristics. The combined collection efficiency curve or penetration curve if all the different sized nozzles approximates a predetermined curve as a respirable particle penetration curve.

SUMMARY OF THE INVENTION

The present invention is directed to an inertial impactor that uses the gas stream flow rate to separate oil particles in internal combustion engine crankcase emissions. The impactor is preferably constructed entirely of sheet metal and is comprised of a housing having a top, a bottom and sidewalls extending substantially unbroken therebetween to define a hollow body having an interior with an interior surface and an exterior with an exterior surface. The top has an aperture to permit a flow nozzle to pass therethrough. The nozzle has a diameter W and a throat that extends a predetermined distance T and stops a predetermined distance S from the bottom of the housing. The nozzle is in fluid communication with said gas stream flow from said engine crankcase. The bottom is located in close proximity to a heat source to act as a primary impactor plate. The sidewalls are further equipped with secondary impactor plates located at predetermined locations along the interior surface and extending into the interior space. One of the sidewalls is further equipped with an orifice to permit gas stream flow from the engine crankcase through the housing, across the primary impactor plate, across the secondary impactor plates and out the orifice in the sidewall to a turbocharger. The inertial impactor is optimized to separate particles from the engine crankcase emission gas flow stream whose aerodynamic diameters are in the range of about 0.3 μm to about 0.7 μm.

DETAILED DESCRIPTION OF A PREFERRED EMBODIMENT

Figure 1:
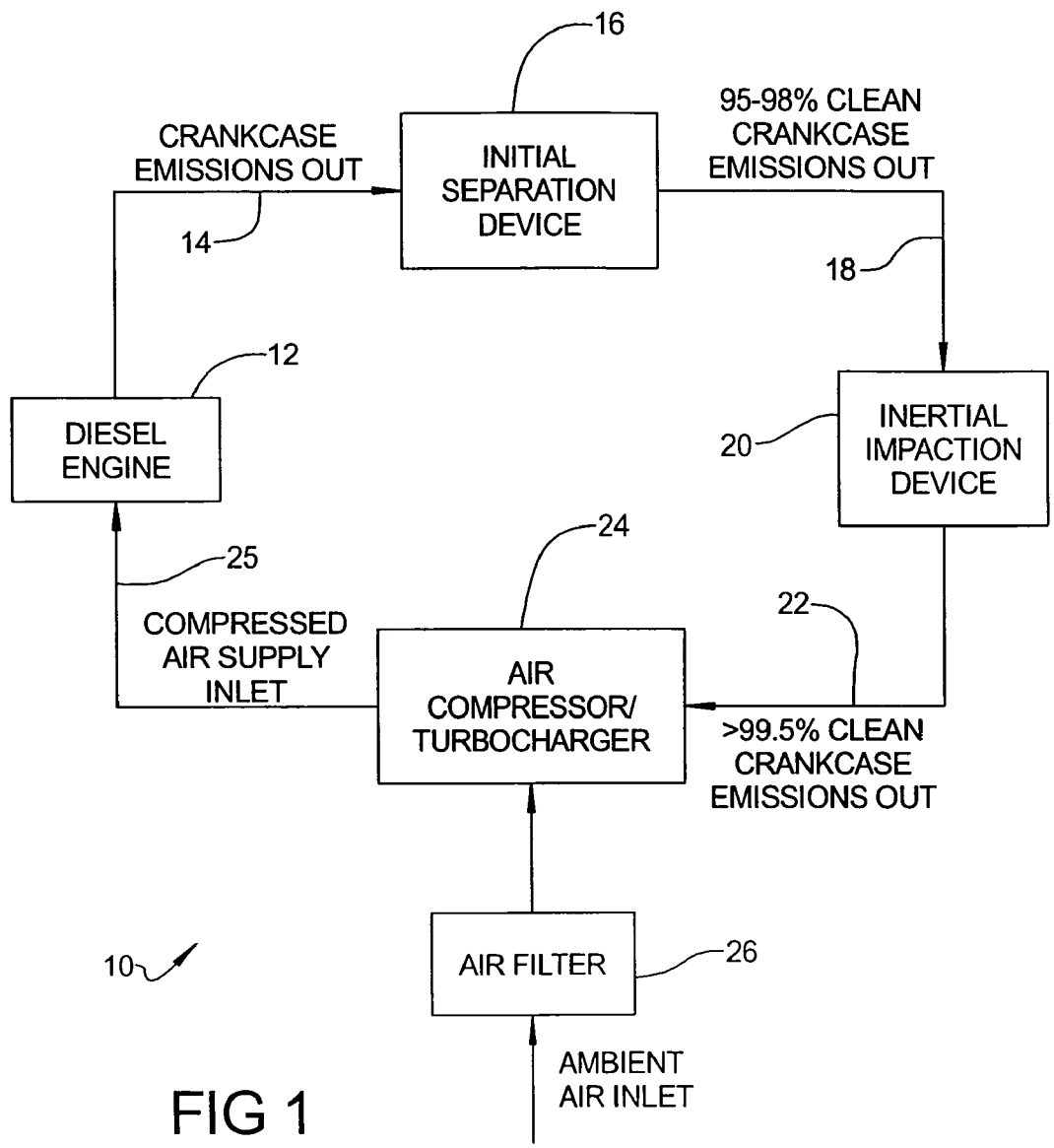
FIG. 1 is a schematic representation of a closed crankcase ventilation system.

Turning now to the drawings wherein like numbers refer to like structures, and particularly to FIG. 1, there is depicted therein a schematic of a closed crankcase ventilation system 10 such as one might encounter in a heavy-duty diesel engine application.

Closed crankcase ventilation system 10 is comprised of an engine 12, preferably a heavy duty diesel engine connected by emission gas stream conduit 14 to an initial separation device 16. A high efficiency initial separation device is preferred, specifically one which eliminates all particles greater than 0.7 μm from the gas stream. The initial separation device is connected to inertial impactor device 20 via initial separation emission conduit 18. After the emission gas is circulated through the inertial impactor in a manner to be hereinafter described, emission particles of oil in the range of 0.3 μm to about 0.7 μm are removed and deposited within the inertial impactor. The resultant purified emission gas is conducted to the turbocharger 24 via inertial impactor emission conduit 22 and mixed with ambient air stream through a filter 26 and then passed via the turbocharger back into the engine to promote efficient combustion. The air from the turbocharger is passed through conduit 25 back to the engine.

Figure 2:
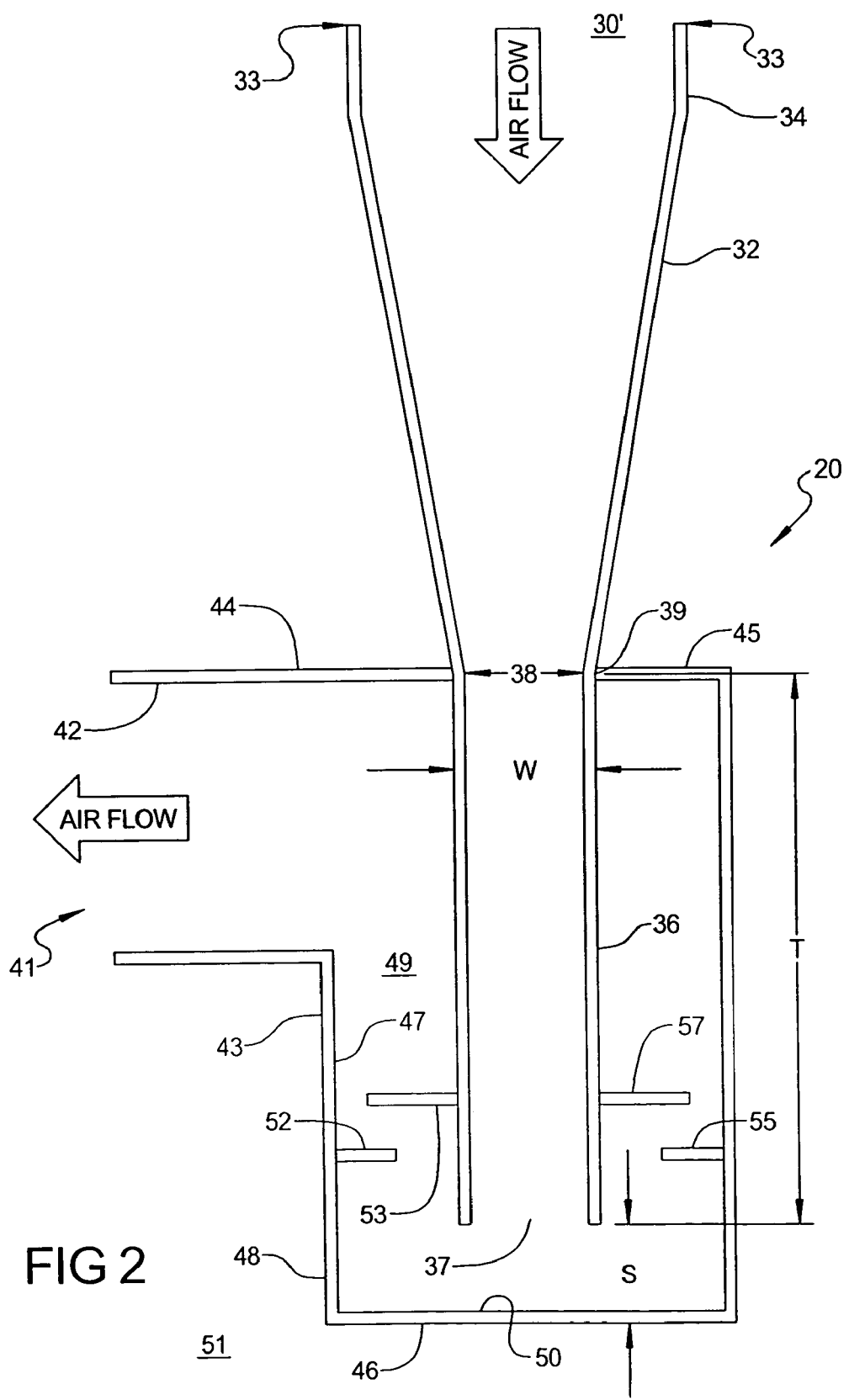
FIG. 2 is a front cutaway view of the inertial impactor of the present invention.

Having thus described in overview the closed crankcase ventilation system, reference to is made to FIG. 2.

Specifically, inertial impactor 20 has a housing 42 comprise of a top 44, a bottom 46 and sidewall 48 extending substantially therebetween to create a hollow housing that has an interior space 49 defined by the interior surface 47 of the top, bottom and sidewalls. Similarly, the housing has an exterior 43 defined by the exterior surface 45 of the top, bottom and sidewalls.

The top surface has an aperture 39 through which extends an air nozzle 32 and into the interior space of the housing. The nozzle has a funnel 34 at one end 35 thereof and that has a diameter 33 that is larger than the diameter 38 of the throat portion 36 of the nozzle. As depicted, the through terminates in an orifice 37. Both the throat and the orifice have an inside diameter W. The Throat extends into the housing a distance T and terminates in close proximity to the bottom surface of the housing. In this regard, the orifice is removed a distance S from the bottom surface of the housing.

The bottom surface of the housing is placed adjacent or in close proximity to a heat source, such as for example the exhaust manifold of an internal combustion engine. In this manner, the bottom surface of the housing acts as the primary impactor surface 50. Positioned at predetermined locations along the sidewalls are secondary impactor surfaces 52, 53, 55 and 57. It is important to note that the dimension of the throat length T and the diameter W and the distance S be carefully determined in order to ensure that the particle separation process selects for the desired particle size carried by the crankcase emission gas stream.

The design of the inertial impactor is based on the Stokes number equation that relates the cut point to the impactor's design and operating parameters. The Stokes number is given by the following formula:

$$St = \frac{P\rho VoCD^2 p}{9\ \mu W}$$

where St is the Stokes Number
Dp is the particle cutoff diameter
Vo is the blowby velocity at Nozzle
Pρ is the particle Density
μ is the fluid viscosity
W is the Nozzle diameter, and
C is the Cunningham Slip Correction Factor Typically, for a round jet inertial impactor, a St value of about 0.4 corresponds to the 50% cutpoint (Marple, V. A and Chien, C. M., Environ. Sci. & TechnoL 8:976-985,1980; Sioutas, C., Koutrakis, P, and Wolfson, J. M., Aerosol Sci. & TechnoL 21 (2):137-149, 1994a). The acceleration nozzle diameter will be 0.2 cm and the collection nozzle diameter will be 0.3 cm. The ratio of the diameters of the two nozzles is chosen to be 1.5 in order to minimize particle losses (Sioutas, C., Koutrakis, P., and Olson, B. A., Aerosol Sci. & TechnoL 21:223-235, 1994b). The value of the Stokes number is a function of the Reynolds number of the flow in the impactor nozzle Re, and of the dimensionless parameters S/W and T/W, where S=jet to plate distance S and T=the throat length. The influence of these three parameters on the value of the Stokes number has been previously published "Characteristics of Laminar Jet Impactors, Marple and Liu, Environmental Science and Technology, Vo. 8, No. 7, pp 648-654, July 1974. This work shows that if the impactor is designed such that S/W is greater than 1.0 (round impactor) or S/W is greater than 1.5 (rectangular impactor) and T/W is greater than ¼, their influence on the 50% particle cut off size is minimal. Thus, for round impactors, the Reynold number is defined as:

$$Re = \frac{P\rho W Vo}{\mu}$$

Where Re is the Reynolds Number
W is the Nozzle Diameter
Vo is the blowby velocity at Nozzle
Pρ is the particle Density
μ is the fluid viscosity Finally, another consideration in designing impactors is that the pressure drops, ΔP, across the impactor nozzle is approximately equal to the dynamic pressure of the air jet in the nozzle:

$$\Delta P = \frac{1}{2}\rho V_o^2$$

Where ρ is Air Density
Vo is the blowby velocity at Nozzle, and
ΔP is change in pressure The engine must be operated within acceptable levels for pressure drop to avoid an unacceptable rise in crankcase pressure of the engine.

It has been found that keeping S/W greater than or equal to 1.0 and 500<Re<3000 will permit better separation. Increasing the throat length T will align the flow streamlines for better impaction velocity. The square root of the Stokes number should be kept between 0.4 and 1.0 for peak separation efficiencies.

By use of these formulae, it is possible to design an inertial impactor of any desired configuration or size to suit the needs at had.

In operation, the inertial impactor of the present invention operates in a closed crankcase ventilation system in the following manner, in reference to FIG. 2.

Specifically, crankcase emissions are vented from the internal combustion engine, shown as a diesel engine through a crankcase emission vent to an initial separation device which may be a filter, which removes about 95% to 98% of the particulate emissions from the gas flow stream. The initial separation device vents the partially cleaned air through a conduit to the inertial impactor of the present invention. By reference to FIG. 1 as well as FIG. 2, it can be seen that the housing is located near or proximal to a heat source, such as an exhaust manifold 51 via its bottom surface. The primary impaction plate is thereby heated by the exhaust manifold, and as the gas flow stream passes through the nozzle, down the throat and over the impaction plate, oil particles in the range of about 0.3 μm to about 0.7 μm are heated and stick to the heated impaction plate where they form a layer of deposits on the surface. Other particles are trapped and deposited onto the secondary impaction plates such that when the gas stream is exited from the housing orifice 41 to the turbocharger, greater than 99.5% of the particulates and oil are removed. Thus, no coating of the turbocharger blades occurs which results in more efficient operation of the turbocharger. In addition, cleaner air is mixed with the ambient air inflow to the turbocharger for injection back into the engine for combustion purposes, thus reducing emission from the operation of the engine.

It is further contemplated that a plurality of the inertial impactors described above may be used in parallel to increase impaction area and decrease the pressure drop.

While various aspects of the invention have been described, it is to be understood that the terms and systems described are merely illustrative to the invention and that modifications may be made by those of ordinary skill in the art without departing from the scope and spirit of the invention.

I claim:

1. An inertial impactor that uses emission gas stream flow rate to separate oil particles in internal combustion engine crankcase emissions, comprising:
a housing having a top, a bottom and sidewalls extending substantially unbroken therebetween to define a hollow body having an interior with an interior surface and an exterior with an exterior surface;
said top having an aperture to permit a flow nozzle to pass therethrough; said nozzle having a funnel at one end with a diameter that is larger than a diameter W of a throat portion that extends a predetermined distance T and stops a predetermined distance S from said bottom; said nozzle in fluid communication with said emission gas stream flow from said engine crankcase;
said bottom in close proximity to an exhaust manifold to act as a heat source to facilitate deposition of said oil particulates on a primary impactor plate;
said sidewalls further equipped with secondary impactor plates located at predetermined locations along said interior surface and extending into said interior space; one said sidewall further equipped with an orifice to permit emission gas stream flow from the engine crankcase through the housing, across the primary impactor plate, across the secondary impactor plates and out the orifice in the sidewall to a turbocharger.

2. The inertial impactor of claim 1, wherein said oil particles are in the range of from about 0.3 μm to about 0.7 μm.

3. The inertial impactor of claim 1, wherein said inertial impactor is designed in accordance with $$St = \frac{P\rho VoCD^2 p}{9 \; \mu W}$$

and $$Re = \frac{P\rho WVo}{\mu}$$

where
St is the Stokes Number
Re is the Reynolds Number
Dp is the particle cutoff diameter
Vo is the blowby velocity at Nozzle
Pρ is the particle Density
μ is the fluid viscosity
W is the Nozzle diameter, and
C is the Cunningham Slip Correction Factor.

4. The inertial impactor of claim 3, wherein S/W is greater than or equal to 1, and 500<Re<3000, and the square root of the Stokes number is between 0.4 and 1.0.

5. An internal combustion engine having at least one inertial impactor that uses gas stream flow rate to separate oil particles in engine crankcase emissions in a closed crankcase ventilation system, comprising:
an internal combustion engine with a closed crankcase ventilation system;
an inertial impactor having a housing having a top, a bottom and sidewalls extending substantially unbroken therebetween to define a hollow body having an interior with an interior surface and an exterior with an exterior surface;
said top having an aperture therethrough to permit a flow nozzle to pass therethrough a predetermined distance and stop a predetermined distance in close proximity to said bottom; said nozzle having a funnel at one end with a diameter that is larger than a diameter W of a throat portion in fluid communication with said gas stream flow from said engine crankcase;
said bottom in close proximity to an exhaust manifold heat source to act as a primary impactor plate;
said sidewalls further equipped with secondary impactor plates located at predetermined locations along said interior surface and extending into said interior space; one said sidewall further equipped with an orifice to permit gas stream flow from the engine crankcase through the housing, across the primary impactor plate, across the secondary impactor plates and out the orifice in the sidewall to a turbocharger.

6. The inertial impactor of claim 5, wherein said oil particles are in the range of from about 0.3 μm to about 0.7 μm.

7. The inertial impactor of claim 5, wherein said inertial impactor is designed in accordance with;

$$St = \frac{P\rho VoCD^2 p}{9 \; \mu W}$$

and $$Re = \frac{P\rho WVo}{\mu}$$

where
- St is the Stokes Number
- Re is the Reynolds Number
- Dp is the particle cutoff diameter
- Vo is the blowby velocity at Nozzle
- P$\rho$ is the particle Density
- $\mu$ is the fluid viscosity
- W is the Nozzle diameter, and
- C is the Cunningham Slip Correction Factor.

8. The internal combustion engine of claim 5, including a plurality of inertial impactors to separate oil particles in gas flow stream from said engine crankcase emissions.

9. The internal combustion engine of claim 5, wherein said engine is a compression ignition engine.

10. The internal combustion engine of claim 7, wherein said inertial impactor is constructed such that S/W is greater than or equal to 1, and 500<Re<3000, and the square root of the Stokes number is between 0.4 and 1.0.

* * * * *